(12) United States Patent
Wittebrood et al.

(10) Patent No.: US 6,391,476 B2
(45) Date of Patent: May 21, 2002

(54) BRAZING SHEET PRODUCT AND METHOD OF MANUFACTURING AN ASSEMBLY USING THE BRAZING SHEET PRODUCT

(75) Inventors: Adrianus Jacobus Wittebrood, Velserbroek; Jacques Hubert Olga Joseph Wijenberg, Amsterdam, both of (NL)

(73) Assignee: Corus Aluminium Walzprodukte GmbH, Koblenz (DE)

(*) Notice: Subject to any disclaimer, the term of this patent is extended or adjusted under 35 U.S.C. 154(b) by 0 days.

(21) Appl. No.: 09/801,840

(22) Filed: Mar. 9, 2001

Related U.S. Application Data

(63) Continuation-in-part of application No. 09/573,980, filed on May 19, 2000.
(60) Provisional application No. 60/209,973, filed on Jun. 8, 2000.

(30) Foreign Application Priority Data

| Mar. 10, 2000 | (EP) | 00200868 |
| May 31, 2000 | (EP) | 00201936 |
| May 18, 2000 | (WO) | PCT/EP00/04608 |
| Jul. 27, 2000 | (EP) | 00202673 |

(51) Int. Cl.[7] ........................ B32B 15/01; B23K 31/00
(52) U.S. Cl. .................. 428/654; 205/183; 205/185; 228/219; 228/221; 228/262.51; 428/648; 428/650; 428/658; 428/680; 428/935; 428/936
(58) Field of Search ............... 428/654, 648, 428/658, 650, 680, 935, 936; 228/219, 221, 262.51; 205/183, 185

(56) References Cited

U.S. PATENT DOCUMENTS

| 2,745,799 A | 5/1956 | Patrie |
| 2,821,014 A | 1/1958 | Miller |
| 3,482,305 A | 12/1969 | Dockus et al. |
| 3,597,658 A | 8/1971 | Rivera |

(List continued on next page.)

FOREIGN PATENT DOCUMENTS

| DE | 3821079 | 6/1988 |
| DE | 3821073 | 1/1989 |
| EP | 227261 | 7/1987 |
| FR | 2354171 | 1/1978 |
| FR | 2617868 | 9/1988 |
| FR | 2617868 | 1/1989 |
| GB | 710096 | 6/1954 |
| GB | 1176688 | 1/1970 |
| WO | 0071784 | 11/2000 |

OTHER PUBLICATIONS

B. E. Cheadle, K. F. Dockus, "Inert Atmosphere Fluxless Brazing of Aluminum Heat Exchangers", SAE Technical Paper Series, No. 880446, Feb. 29, 1988–Mar. 4, 1988.

(List continued on next page.)

Primary Examiner—Robert R. Koehler
(74) Attorney, Agent, or Firm—Stevens, Davis, Miller & Mosher, LLP

(57) ABSTRACT

A brazing sheet product having a core sheet (1) made of an aluminium alloy, having one or both of the surfaces of the core sheet clad with an aluminium clad layer (2), and a layer (3) comprising nickel on the outersurface of one or both the aluminium clad layer or layers (2). There is a layer (4) comprising zinc or tin as a bonding layer between the outersurface of the aluminium clad layer or layers (2) and the layer (3) comprising nickel. The aluminium clad alloy layer comprises, in weight percent: Si 2 to 18, Mg up to 8.0, Zn up to 5.0, Cu up to 5.0, Mn up to 0.30, In up to 0.30, Fe up to 0.80, Sr up to 0.20, at least one element selected from the group consisting of: Bi 0.01 to 1.0, Pb 0.01 to 1.0, Li 0.01 to 1.0, Sb 0.01 to 1.0, impurities each up to 0.05, total up to 0.20; and balance aluminium.

26 Claims, 1 Drawing Sheet

U.S. PATENT DOCUMENTS

| | | |
|---|---|---|
| 3,963,454 A | 6/1976 | Singleton, Jr. |
| 3,970,237 A | 7/1976 | Dockus |
| 4,028,200 A | 6/1977 | Dockus |
| 4,157,154 A | 6/1979 | Scott et al. |
| 4,164,454 A | 8/1979 | Schober |
| 4,388,159 A | 6/1983 | Dockus et al. |
| 4,602,731 A | 7/1986 | Dockus |
| 4,721,653 A | 1/1988 | Oda et al. |
| 4,735,867 A | 4/1988 | Finnegan |
| 5,069,980 A | 12/1991 | Namba et al. |
| 5,422,191 A | 6/1995 | Childree |
| 5,466,360 A | 11/1995 | Ehrsam et al. |
| 5,601,695 A | 2/1997 | Muranushi |
| 6,129,262 A | 10/2000 | Cooper et al. |

OTHER PUBLICATIONS

"Aluminum Soft–Soldering", Wernick & Pinner, Bureau of Mines Technology, XP–002119816, 2301 NTIS Tech. Notes (Manufacturing), No. 1G, (1985) Jan.

Wernick & Pinner, The Surface Treatment and Finishing of Aluminum and its Alloys, 5th Ed., vol. 2, pp. 1023–1071. "Plating on Aluminum", Chapter 14, XP–002119817 (published before Mar. 10, 2000).

General Textbook by Wernick and Pinner, "The Surface Treatment and Finishing of Aluminium and its Alloys", 5th edition, vol. 2, pp. 1023–1071, Nov. 1988.

Adrianus Jacobus Wittebrood, Jacques Hubert Olga Joseph Wijenberg, Joop Nicolaas Mooij, "Nickel–plated Aluminium Brazing Sheet", Research Disclosure, No. 439, pp. 1946–1947 (Nov. 2000).

Wernick and Pinner, "The Surface Treatment and Finishing of Aluminium and its Alloys", 5th edition, vol. 1, pp. 181–182 and pp. 191–203 (1988) (no month given).

Wernick and Pinner, "The Surface Treatment and Finishing of Aluminium and its Alloys", 5th edition, vol. 2, pp. 1006–1022 and pp. 1023–1071 (Ch. 14–15) (1988) (no month given).

SAE Paper No. 880446 by B.E. Cheadle and K.F. Dockus Inert Atmosphere Fluxless Brazing of Aluminum Heat Exchangers, ICE, Detroit, Michigan, Feb.29–Mar 4, 1998 pp. 1–11.

U.S. Patent Application S.N.09/985,945. Filed Nov. 6, 2001; Wittebrood, et al.

U.S. Patent Application S.N.09/986,475, Filed Nov. 8, 2001; Wittebrood, et al.

BRAZING SHEET PRODUCT AND METHOD OF MANUFACTURING AN ASSEMBLY USING THE BRAZING SHEET PRODUCT

CROSS-REFERENCE TO RELATED APPLICATIONS

This is a continuation-in-part of U.S. patent application Ser. No. 09/573,980, filed May 19, 2000, now allowed.

This claims priority under 35 USC 119 from U.S. provisional patent application Serial No. 60/209,973, filed Jun. 8, 2000, incorporated herein by reference in its entirety.

FIELD OF THE INVENTION

The invention relates to a brazing sheet product in which a layer comprising nickel is plated onto a surface of a clad layer made of an Al—Si alloy containing Si in the range of 2 to 18 weight %. The invention also relates to a brazed assembly comprising at least one component made of the brazing sheet product and to a method of manufacturing an assembly of brazed components.

BACKGROUND OF THE INVENTION

For the purpose of this invention brazing sheet is to be understood as a core sheet, for example of aluminium or aluminium alloy, having on at least one side a brazeable aluminium alloy. Typical brazeable aluminium alloys useful as such a clad layer are the Aluminium Association (AA) 4xxx-series alloys, typically having Si in the range of 2 to 18 weight %. The brazeable aluminium alloys may be coupled to the core alloy in various ways known in the art, for example by means of roll bonding, cladding, or semi-continuous or continuous casting.

Controlled Atmosphere Brazing (CAB) and Vacuum Brazing (VB) are the two main processes used for industrial scale aluminium brazing. Industrial vacuum brazing has been used since the 1950's, while CAB became popular in the early 1980's after the introduction of the NOCOLOK (trade mark) brazing flux. Vacuum brazing is an essentially discontinuous process and puts high demands on material cleanliness. The disruption of the oxide layer present is mainly caused by the evaporation of magnesium from the clad alloy. There is always more magnesium present in the clad alloy then necessary. The excess magnesium condenses on the cold spots in the furnace and has to be removed frequently. The capital investment for suitable equipment is relatively high.

CAB requires an additional process step prior to brazing as compared to VB, since a brazing flux has to be applied prior to brazing. CAB is essentially a continuous process in which, if the proper brazing flux is being used, high volumes of brazed assemblies can be manufactured. The brazing flux dissolves the oxide layer at brazing temperature allowing the clad alloy to flow properly. When the NOCOLOK flux is used the surface needs to be cleaned thoroughly prior to flux application. To obtain good brazing results the brazing flux has to be applied on the total surface of the brazed assembly. This can cause difficulties with certain types of assemblies because of their design. For example, because evaporator type heat exchangers have a large internal surface, problems can arise because of poor access to the interior. For good brazing results the flux has to adhere to the aluminium surface before brazing. Unfortunately the brazing flux after drying can easily fall off due to small mechanical vibrations. During the brazing cycle, corrosive fumes such as HF are generated. This puts a high demand on the corrosion resistance of the materials applied for the furnace.

Ideally, a material should be available that can be used for CAB but does not have the requirements and defects of the brazing flux application. Such a material can be supplied to a manufacturer of brazed assemblies and is ready to use directly after shaping of the assembly parts. No additional brazing fluxing operations have to be carried out. Presently, only one process for flux-less brazing is used on an industrial scale. The material for this process can be for example standard brazing sheet made from an AA3xxx-series core alloy and clad on both sides with a cladding of an AA4xxx-series alloy. Before the brazing sheet can be used the surface has to be modified in such a way that the naturally occurring oxide layer does not interfere during the brazing cycle. The method of achieving good brazing is to deposit a specific amount of nickel on the surface of the clad alloy. If properly applied, the nickel reacts with the underlying aluminium. The nickel can be applied by using a shim of nickel between two parts to be joined or can be deposited by electroplating. When electroplating is used the adherence of the nickel should be sufficient to withstand typical shaping operations being used in for example heat exchanger manufacture.

The processes for nickel-plating of aluminium brazing sheet are known from each of U.S. Pat. Nos. 3,970,237, 4,028,200, 4,164,454, and SAE-paper No. 880446 by B. E. Cheadle and K. F. Dockus. According to each of these documents, nickel is preferably deposited in combination with lead. Alternatively, cobalt is deposited in combination with lead. It is known in the art that instead of nickel, cobalt or combinations thereof, also iron may be used. The lead addition is used to improve the wettability of the clad alloy during the brazing cycle. An important characteristic of these plating processes is that the nickel is preferentially deposited on the silicon particles of the clad alloy. To obtain sufficient nickel for brazing on the surface, the clad alloy should contain a relatively large number of silicon particles to act as nuclei for the nickel deposition. It is believed that to obtain sufficient nucleation sites before plating a part of the aluminium in which the silicon particles are embedded should be removed by chemical and/or mechanical pre-treatment. This is believed a necessary condition to obtain a sufficient nickel coverage to serve as nuclei for the wetting action of the brazing or clad alloy. On a microscopic scale the surface of the Si-containing cladding of the brazing sheet is covered with nickel globules.

Some other disclosures of Ni-plating found in the prior art literature will be mentioned below.

General textbook by Wernick and Pinner, "The Surface Treatment and Finishing of Aluminium and its Alloys", 5th edition, Volume 2, pp.1023–1071. This textbook describes in general immersion processes for plating on aluminium.

Paper by the Bureau of Mines Technology, "Aluminium Soft-Soldering", 2301 N.T.I.S. Tech Notes (manufacturing), 1985, January No.1G, Springfield, Va., USA, pp.12–13. This paper describes a method of manufacturing aluminium for soft-soldering wherein the aluminium surfaces are joined by conventional tin-lead solder. The method includes firstly cleaning the aluminium surface carefully prior to the zinc application. Secondly a thin zinc coat is deposited and subsequently electroplated with an alloy of nickel-copper. After the nickel-copper plating has been accomplished, soldering using normal procedures can be accomplished.

FR-A-2,617,868 describes a method of manufacturing aluminium product with a brazeable surface coating of tin or a tin-bismuth alloy, wherein the product is provided with an intermediate layer. This intermediate layer is composed of a first layer of zinc and a second layer of nickel, which nickel has been deposited by electrolysis from a neutral electrolyte. Here, the underlying aluminium or aluminium alloy is not melted in the brazing process.

SUMMARY OF THE INVENTION

It is an object of the invention to provide a brazing sheet product having a core sheet and filler material, to be melted during brazing, said filler material comprising a clad layer of an Al—Si alloy and a nickel layer on the clad layer, in which there is good adhesion of the nickel layer to the clad layer.

It is an object of the invention to provide a brazing sheet product which can be used in a vacuum brazing process as well as in an controlled atmosphere brazing process in the absence of a brazing-flux, but ideally suitable for CAB process in the absence of a brazing-flux.

It is another object of the invention to provide a method of manufacturing an assembly of brazed components using the brazing sheet product of this invention.

In accordance with the invention in one aspect there is provided a brazing sheet product having a core sheet (1) made of an aluminium alloy, having at least one of the surfaces of said core sheet clad with an aluminium clad layer (2), and a layer (3) comprising nickel on the outersurface of at least one of said aluminium clad layer or layers (2), and wherein there is a layer (4) comprising zinc or tin as a bonding layer between said outersurface of said aluminium clad layer or layers and said layer (3) comprising nickel and further wherein the aluminium clad alloy comprising, in weight percent:

Si 2 to 18
Mg up to 8.0
Zn up to 5.0
Cu up to 5.0
Mn up to 0.30
In up to 0.30
Fe up to 0.8
Sr up to 0.20
at least one element selected from the group consisting of:
  Bi 0.01 to 1.0
  Pb 0.01 to 1.0
  Li 0.01 to 1.0
  Sb 0.01 to 1.0
  (preferably the magnesium level in the clad layer does not exceed 2.0%, i.e., Mg is 0.2 to 2.0, when it is present essentially only to promote the wetting action of the brazing alloy)
other elements/impurities each up to 0.05, total up to 0.20
  balance aluminium.

In the present specification, the term "up to" means "≦", for example "up to 0.20" means "≦0.20".

By the zinc or tin comprising bonding layer a very effective bond between the aluminium alloy clad layer and the layer comprising nickel is formed, the bond remaining effective during subsequent deformation of the brazing sheet, for example by bending. The coverage of the nickel layer is no longer dependent on the surface characteristics of the bare clad layer. The brazing sheet product obtained is suitable for flux-less brazing under controlled atmosphere conditions.

The invention is based in part on the insight that to obtain a well-bonded nickel layer on the Si-containing aluminium clad layer of the brazing sheet product so that the bond remains effective under large deformation, pretreatment of the clad layer is extremely important. The prior art processes apparently aimed at applying the nickel in a distributed form, principally to the silicon particles at the surface of the clad layer, rather than trying to achieve a uniform nickel layer. In the present invention the surface of the Si-containing clad alloy is altered in such a way that the nickel coverage is independent of the silicon particles at its surface. The nickel plating does not take place on the silicon particles but on the applied bonding layer comprising zinc or tin. Since the nickel thus is deposited on the total surface of the aluminium clad layer the necessary reaction before brazing can take place much more easily as compared to the process of the prior art. The zinc or tin applied does not interfere at all during the brazing process, and may contain a component to assist the brazing, as described below. Since the nickel is deposited smoothly and uniformly on the surface, the use of lead to promote wetting during brazing can be reduced or avoided, or other elements such as bismuth may be used for this purpose. A further important advantage of the nickel or nickel-lead deposited smoothly and uniformly on the surface is that the total amount of nickel to be applied in order to achieve good flux-less brazing can be reduced. Another advantage is that the complete surface coverage avoids any difficulty caused by aluminium oxide at the surface of the clad layer.

Furthermore, the invention is based in part on the insight that the aluminium clad layer comprise at least one or more elements selected from the group consisting of bismuth, lead, lithium and antimony, each in a range of 0.01 to 1.0%, and the combination of two or more elements does preferably not exceed 1.0%, and that magnesium may be present in a range of 0.2 to 2.0%. The combination of magnesium with one or more other elements from this group does preferably not exceed 2.5%. Hence, magnesium may be present in the aluminium clad layer up to 8.0%, preferred ranges have been set out below, to enhance amongst others the mechanical properties of the aluminium clad layer, whereas it has also been found that magnesium in a range of 0.2 to 2.0% may also act in a similar way as elements selected from the group bismuth, lead, lithium and antimony. Preferably the magnesium level in the clad layer does not exceed 2.0% when it is present essentially only to promote the wetting action of the brazing alloy in combination with the lead-free nickel layer. Further alloying elements may be added to improve specific properties of the clad layer. In U.S. Pat. No. 3,970,237 it is mentioned that the aluminium clad layer is preferably coated with a layer of nickel, nickel-lead, cobalt, cobalt-lead or combinations thereof. The additions of lead is believed to improve the wettability during brazing. However, in accordance with the invention it has been found that the nickel and/or cobalt layer itself does not need to comprise the lead as an alloying addition. Surprisingly it has been found that an equal or even better results can be obtained if one or more elements of the group Bi, Pb, Li and Sb and Mg is being added in the given ranges to the aluminium clad layer itself Adding one or more of these alloying elements to the aluminium clad layer has the advantage that the composition of the plating bath becomes less complex, which is a major achievement in itself, whereas the alloying addition to the cladding is very simple when manufacturing the clad layer. As a result the electroplated nickel layer applied may essentially consist of nickel and unavoidable impurities. From an operational point of view bismuth is the most preferred alloying element to the aluminium clad layer. Furthermore it has been found that the element bismuth is the most preferred alloying element to promote wetting, and consequently less of this element is required to achieve a similar effect as with lead addition in the nickel layer. Although, lead as alloying element in the clad layer in the given range results in the desired effect, the addition of this element is preferably avoided since it is from an environmentally point of view a highly undesirable element.

While it is in known to apply a zinc layer prior to nickel-plating of articles, it is believed that this has not been done in a nickel-plated aluminium alloy clad brazing sheet product, in which as discussed above it has been thought necessary to plate the nickel directly on the Si-containing clad layer.

Very good results of the brazing sheet according to the invention may be obtained where the bonding layer is applied with an immersion zincate treatment or immersion stannate treatment, often referred to as displacement plating. Additionally, the bonding layer may be an electroplated layer.

In an embodiment of the brazing sheet product according to the invention the applied layer comprising zinc or tin has a thickness only up to 0.5 $\mu$m, more preferably up to 0.3 $\mu$m (300 nm), and most preferably in the range of 0.01 to 0.15 $\mu$m (10–15 nm). In the best results obtained so far a thickness of about 30 nm has been used. A coating thickness of greater than 0.5 $\mu$m requires a prolonged treatment time, e.g. for displacement plating, and is thought to have no further advantages for improving the adhesion.

The zinc or tin layer applied in the brazing sheet product of the invention may be essentially a pure zinc or tin layer or may be primarily zinc or tin (e.g. at least 50 weight %). Minor amounts of impurity elements or deliberately added elements may be present, as discussed in more detail below. Typically impurity elements are present at less than 10%, more usually less than 5% by weight in the zinc or tin layer.

The layer comprising nickel is preferably an electroplated layer. The adhesion of the layer comprising nickel applied on the layer comprising zinc or tin is excellent and can withstand relatively severe shaping operations without the occurrence of delamination.

Preferably in this brazing sheet product the layer comprising nickel has a thickness up to 2.0 $\mu$m, preferably up to 1.0 $\mu$m, and more preferably up to 0.5 $\mu$m. A coating thickness of greater than 2.0 $\mu$m requires a prolonged treatment time for plating, may result in wrinkling of the molten filler material during brazing. A preferred minimum thickness for this Ni-containing layer is 0.3 $\mu$m. However, other techniques such as roll bonding, thermal spraying, Chemical Vapour Deposition and Physical Vapour Deposition may be used.

Preferably in this brazing sheet product each aluminium clad layer has a thickness ranging from about 2 to 20% of the total thickness of the total brazing sheet product thickness.

Preferably in the brazing sheet product the material which on brazing becomes molten, commonly known as the filler material, in particular the nickel layer and/or the zinc or tin layer comprise one or more elements to reduce the surface tension of the molten brazing alloy during brazing. In the invention it has been found surprisingly that contrary to the teaching of the prior art, it is not necessary to add lead as an alloying element to the Ni-layer in order to promote the wetting action of the brazing alloy. Nevertheless, lead and other suitable elements, for which bismuth is preferred to most, may be added to the nickel layer or the zinc or tin layer or to both. This has various advantages from the manufacturing point of view of the brazing sheet.

In the filler material as a whole therefore, there may be present, in weight %, at least one of
Bi 0.01 to 0.5, preferably 0.05 to 0.5
Mg 0.2 to 2.0
Li 0.01 to 0.5, preferably 0.05 to 0.5
Sb 0.01 to 0.5, preferably 0.05 to 0.5

The zinc or tin layer itself may thus comprise one or more additional elements selected from the group consisting of bismuth, lead, lithium and antimony. The amount of the additional element or elements in total may be up to 50%, but preferably is less than 25%, e.g. in the range 1 to 25%.

In a preferred embodiment of the brazing sheet product according to the invention the bismuth addition in the aluminium clad layer has an upper limit of 0.5%. A suitable lower limit for the bismuth addition is 0.01% and more preferably 0.05%.

In a preferred embodiment of the brazing sheet product according to the invention the lithium addition in the aluminium clad layer has an upper limit of 0.5%. A suitable range for the lithium addition is 0.01–0.3%.

In a preferred embodiment of the brazing sheet product according to the invention the antimony addition in the aluminium clad layer has an upper limit of 0.5%. A suitable range for the antimony addition is 0.01–0.3%.

In an embodiment, the aluminium clad layer comprises, in weight %, Si in the range of 2 to 18%, and preferably, 7 to 18%, as alloying element and further magnesium in the range of up to 8.0%, and preferably up to 5.0%. Typically, magnesium may be present in the range of 0.5 to 8.0%. Preferably the magnesium is in the range of 0.5 to 5%, and more preferably 0.5 to 2.5%. Further alloying elements may be added such as, but not limited to, Cu, Zn, and Sr in suitable ranges. For example, zinc may be added in the range from 0.5 to 3.0%. It has been found that in use of the brazing sheet product the presence of magnesium in the clad layer has no detrimental effects during brazing. This is a major improvement over known brazing sheet products. It allows for the design of aluminium clad layers which may contribute to the strength of the total brazing sheet product or alternatively the brazing sheet products having thinner clay layers. Furthermore, it allows that a Mg-containing brazing sheet may be applied in both Vacuum Brazing and flux-less Controlled Atmosphere Brazing. The latter possibility has many economical and technical advantages. In addition, it has been found that the addition of both bismuth and magnesium as alloying elements overcomes the mandatory need for the addition of wetting or bonding promoting alloying elements to the sequentially electroplated nickel layer. The brazing sheet product according to the invention may readily be used in the existing industrial brazing lines.

In another embodiment the aluminium clad layer comprises, in weight %, Si in the range of 2 to 18%, and preferably 7 to 18%, as alloying element and further zinc in the range of up to 5%. Preferably the zinc is in the range of 0.5 to 3%. Further alloying elements may be added such as, but not limited to, Mg and Cu in suitable ranges. In accordance with the invention it has been found that when this brazing sheet product is used the presence of zinc in the cladding has no detrimental effects during brazing. This is a major improvement over known brazing sheet products. It allows for the design of a cladding which may contribute to the strength of the total brazing sheet product. Further, the brazing sheet product wherein the cladding contains zinc as a deliberate alloying element may be applied in both Vacuum Brazing and flux-less Controlled Atmosphere Brazing, both processes being used on an industrial scale.

In another embodiment the aluminium clad layer comprises, in weight %, Si in the range of 2 to 18%, and preferably 7 to 18%, as alloying element and further copper in the range of up to 5%. Preferably the copper is in the range of 3.2 to 4.5%. Further alloying elements may be added such as, but not limited to, Mg, and Zn in suitable ranges. In accordance with the invention it has been found that when this brazing sheet product is used the presence of copper in the cladding has no detrimental effects during brazing. This is a major improvement over known brazing sheet products. It allows for the design of a cladding which may contribute to the strength of the total brazing sheet product. Further, the brazing sheet product wherein the cladding contains copper as a deliberate alloying element may be applied in both Vacuum Brazing and flux-less Controlled Atmosphere Brazing, both processing being used on an industrial scale.

In all embodiments of the aluminium clad layer indium ("In") in a range of up to 0.30% may be present as an alloying element to reach a more electronegative corrosion potential of the aluminium clad alloy as compared to the aluminium core alloy. Indium has been found to be much more effective in reducing the corrosion potential of the alloy as compared to zinc additions. Typically 0.1% In is as effective as 2.5% Zn.

In all embodiments of the aluminium clad layer each of manganese and zirconium may be present in the aluminium clad layer as an impurity element in a range of up to 0.30%, and is preferably present only up to 0.10% and more preferably up to 0.05%.

In all embodiments of the aluminium clad layer iron may be present in the clad layer as a typical impurity element in aluminium alloys in a range of up to 0.8%, and preferably in a range of up to 0.4%.

In all embodiments of the aluminium clad layer strontium in a range of up to 0.20% may be added to modify the silicon present in the clad layer during the solidification when casting the clad alloy. A more preferred maximum for the strontium addition is up to 0.05%.

In an embodiment of the brazing sheet product according to the invention, the core sheet is an aluminium alloy comprising magnesium in a range of up to 8.0%. In a preferred embodiment magnesium is in a range of 0.5 to 5.0%. Further alloying elements may be added such as, but not limited to, Cu, Zn, Bi, V, Fe, Zr, Ag, Si, Ni, Co and Mn in suitable ranges. It has been found that when the brazing sheet product of the invention is used, the presence of magnesium in the aluminium clad layer has no detrimental effects during brazing. This is a major improvement over the known brazing sheets. The diffusion of Mg from the core to the cladding during the manufacturing of the brazing sheet product itself and its application in a subsequent brazing process, appears to have no detrimental effects on the brazeability of the brazing sheet product in accordance with the invention. This allows for the design of high strength brazing sheet products having an aluminium core sheet having magnesium in the given range as a strengthening element. The product may be applied in both Vacuum Brazing (VB) and flux-less Controlled Atmosphere Brazing (CAB), both processes being used extensively on an industrial scale.

In the brazing sheet product according to the invention the core sheet may be coupled to the aluminium clad layer via an intermediate layer. The benefits of having such an intermediate layer or interlayer are described in for example U.S. Pat. No. 2,821,014, the contents of which are incorporated here by reference.

The invention further provides a brazed assembly comprising at least one component made of the brazing sheet product produced in accordance with the invention described above and elsewhere in the present specification.

In a further aspect of the invention there is provided in a method of manufacturing a brazed assembly using the brazing sheet product in accordance with the invention, comprising the sequential process steps of:

(a) shaping parts of which at least one is made from the brazing sheet product of the invention as set out above;

(b) assembling the parts into an assembly;

(c) brazing the assembly under a vacuum or in an inert atmosphere in the absence of a brazing-flux at elevated temperature for a period long enough for melting and spreading of the filler alloy, whereby the filler alloy is formed by at least the clad alloy (2), the bonding layer (4) and the Ni layer (3);

(d) cooling the brazed assembly. The cooling rate may be in the range of typical brazing furnace cooling rates. Typical cooling rates are cooling rates of at least 10° C./min or more, typically 40° C./min or more. In dependence on the aluminium alloy of the core sheet the process may include the further processing step (e) of ageing of the brazed and cooled assembly in order to optimise the mechanical and/or corrosion properties of the resultant assembly. The use of the brazing sheet product in accordance with the invention has been found to result in a lower brazing temperature by about 10° C. This reduced brazing temperature allows for a significant reduction of the industrial scale processing time for a whole brazing cycle, typically a time reduction of 20% or more has been found.

In a further aspect of the invention there is provided in a method of use of the aluminium clad alloy, set out above and set forth elsewhere in the present specification, in a brazing sheet product.

In a further aspect of the invention there is provided in a method of use of the aluminium clad alloy, set out above and set forth elsewhere in the present specification, in a brazing sheet product in a method of manufacturing a brazed assembly in an inert atmosphere brazing (CAB) process in the absence of a brazing-flux.

Patent Cooperation Treaty application number PCT/EP00/04608, filed May 18, 2000, is incorporated herein by reference in its entirety.

BRIEF DESCRIPTION OF THE DRAWINGS

The invention will now be illustrated by several non-limitative examples, and with reference to the drawings, wherein.

DESCRIPTION OF PREFERRED EMBODIMENTS

Figure 1:
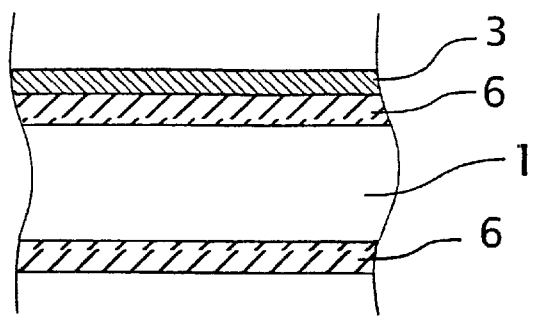
FIG. 1 is a schematic longitudinal section showing the structure of brazing sheet product according to the state of the art.

FIG. 1 shows schematically brazing sheet in accordance with the prior art as would be obtained by the process in accordance with for example U.S. Pat. No. 3,970,237. The brazing sheet product consists of a core sheet 1 on one or both sides clad with a aluminium clad layer 6 comprising an Al—Si-alloy. On top of the clad layer 6 a thin nickel layer 3, preferably a nickel-lead layer, is applied by means of electroplating.

Figure 2:
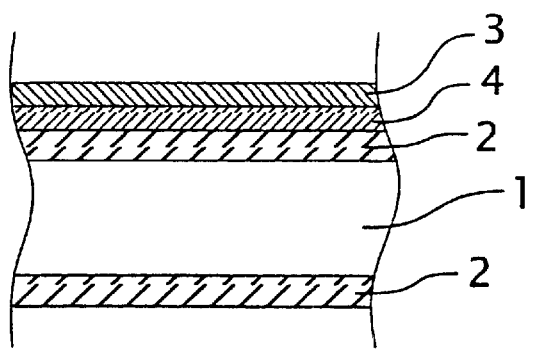
FIG. 2 is a schematic longitudinal section showing the structure of brazing sheet product according to the invention.

FIG. 2 shows schematically brazing sheet in accordance with the present invention in which between the clad layer 2 comprising an Al—Si—Bi alloy and the Ni-layer 3 a further layer 4 of zinc or tin is applied, the advantages of which are set out above. In FIG. 2 the layers 4 and 3 have been shown on only one side of the brazing sheet, but it will be immediately apparent to the skilled person that they may also be applied on both sides of the brazing sheet product. The composition of the various layers and their advantages have been set out above.

Figure 3:
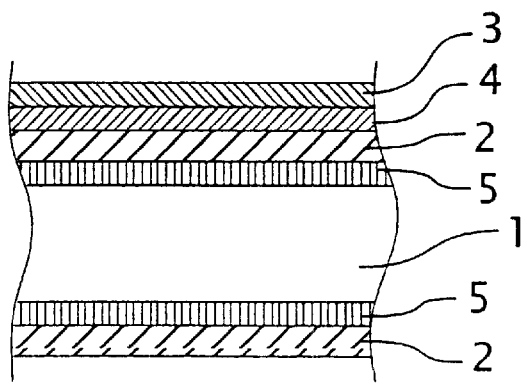
FIG. 3 is a schematic longitudinal section showing the structure of brazing sheet product according to the invention.

FIG. 3 shows schematically a further brazing sheet in accordance with the present invention which has the layers of FIG. 2 and a further intermediate layer 5 between the core sheet 1 and the clad layer 2 on both sides. In FIG. 3 the layers 4 and 3 have been shown on only one side of the brazing sheet, but it will be immediately apparent to the skilled person that they may also be applied on both sides of the brazing sheet product. In addition the intermediate layer 5 may also be applied on one side of the brazing sheet, preferably on the side comprising also the layers 4 and 3. The possible compositions of the various layers and their advantages have been set out above.

A suitable interlayer is described in U.S. Pat. No. 2,321, 014 at column 3, lines 29–45; column 3, line 74 to column 4, lines 20; and column 5, lines 33–47.

EXAMPLE

On a laboratory scale of testing aluminium brazing sheets manufactured from an Aluminium Association (AA)3003 core alloy clad on one side with AA4000-series aluminium clad alloys of four different compositions (see Table 1), and having a total thickness of 0.5 mm, and a clad layer thickness of about 50 μm, were treated as set out in Table 2.

The treatment consisted of the following sequential process steps:

cleaning by immersion for 180 sec. in ChemTec 30014 (a commercial available degreaser and alkaline etch cleaner), followed by rinsing;

alkaline etching for 20 sec. in ChemTec 30203 (a commercial available alkaline etch cleaner) at ambient temperature, followed by rinsing;

optionally desmutting for 4 sec. in an acidic oxidizing bath, typically 25–50 vol % nitric acid, comprising ChemTec 11093 (a commercial available pickle activator) at ambient temperature, followed by rinsing;

zincate immersion using ChemTec 024202 for 12 sec. at room temperature followed by rinsing;

nickel electroplating, and rinsing.

For the nickel electroplating a basic bath without lead has been used, indicated as "L-" in Table 2. The lead-free basic bath comprised 50 g/l nickel sulphate, 50 g/l nickel chloride, 30 g/l sodium citrate, and 75 ml/l ammonium hydroxide (30%). The plating conditions at 26° C. were such that a plating time of 50 sec. resulted in a nickel plated layer of 0.5 μm thickness using a current density of 3 A/dm².

The nickel plated specimens have been tested for adhesion using the Erichsen dome test (5 mm), and the T-bend test. A value assessment is then given to the adhesion where: (−)=poor, (±)=fair, and (+)=good. The brazeability has been assessed as follows. On a laboratory scale of testing the brazing tests were carried out in a small quartz furnace. Small coupons of 25 mm×25 mm were cut from the nickel-plated sheets. A small strip of an AA3003 alloy measuring 30 mm×7 mm×1 mm was bent in the center to an angle of 45° and laid on the coupons. The strip on the coupon samples were heated under flowing nitrogen, with heating in about 10 minutes from room temperature to 580° C., dwell time at 580° C. for 1 minute, cooling from 580° C. to room temperature. The brazing process was judged on possible formation of wrinkles, capillary depression and fillet formation. An overall assessment was given where: (−)=poor brazeability, (−/±)=fair brazeability, (±)=good brazeability, and (+)=excellent brazeability. The results obtained are summarised in Table 2.

From the results from Table 2 it can be seen that applying a zincate treatment is essential to have a good adhesion of the Ni-plated layer. From the results of clad alloy no. 1 it can be seen that omitting the desmutting step still results in a good adhesion of the Ni-plated layer. The results of clad layer no. 2 demonstrate that adding Bi to the cladding results in an excellent brazeability. Consequently, the addition of lead to the nickel layer can be omitted in accordance with the invention. The results of clad layer no. 3 demonstrate that adding Bi to the cladding in combination with magnesium still results in an excellent brazeability. The results of clad layer no. 4 demonstrate that adding Bi to the cladding in combination with zinc still results in an excellent brazeability. Whereas having neither bismuth nor lead present in the clad layer nor lead present in the nickel layer results in a poor brazeability (see clad alloy no.1).

TABLE 1

Composition of the aluminium clad alloy, in weight %. Balance Al and inevitable impurities (each < 0.05%, total < 0.20%).

| Alloy | Si | Fe | Cu | Mn | Mg | Zn | Ti | Bi |
|---|---|---|---|---|---|---|---|---|
| 1 | 10.0 | 0.3 | <0.01 | <0.02 | <0.02 | <0.02 | 0.003 | — |
| 2 | 8.5 | 0.2 | <0.01 | <0.02 | <0.02 | <0.02 | 0.003 | 0.09 |
| 3 | 9.6 | 0.25 | <0.01 | <0.02 | 1.35 | <0.02 | 0.003 | 0.13 |
| 4 | 7.6 | 0.35 | <0.01 | <0.02 | <0.02 | 1.02 | 0.003 | 0.11 |

TABLE 2

Pretreatment applied and testing results.

| Clad alloy no. | Clean. | Etching | Desmut. | Zincate | Ni-plating | Adhesion | Brazeability |
|---|---|---|---|---|---|---|---|
| 1 | yes | yes | yes | yes | L- | + | − |
| 1 | yes | yes | no | yes | L- | + | − |
| 2/3/4 | yes | yes | yes | yes | L- | + | + |

Having now fully described the invention, it will be apparent to one of ordinary skill in the art that many changes and modifications can be made without departing from the spirit or scope of the invention as herein described.

What is claimed is:

1. Brazing sheet product comprising:

a core sheet (1) made of an aluminium alloy; an aluminium clad layer (2) cladding at least one of the surfaces of said core sheet; a layer (3) comprising nickel on the outersurface of one or both said aluminium clad layer or layers (2); and a layer (4) comprising zinc or tin as a bonding layer between said outersurface of said aluminium clad layer or layers and said layer (3) comprising nickel;

wherein said aluminium clad layer (2) is made of an alloy which comprises, in weight percent:

Si 2 to 18

Mg up to 8.0

Zn up to 5.0

Cu up to 5.0

Mn up to 0.30

In up to 0.30
Fe up to 0.80
Sr up to 0.20
at least one element selected from the group consisting of:
  Bi 0.01 to 1.0
  Pb 0.01 to 1.0
  Li 0.01 to 1.0
  Sb 0.01 to 1.0
impurities each up to 0.05, total impurities up to 0.20, balance aluminium.

2. Brazing sheet product according to claim 1, wherein said bonding layer (4) is an electroplated layer.

3. Brazing sheet product according to claim 1, wherein said bonding layer (4) has a thickness of not more than 0.5 µm.

4. Brazing sheet product according to claim 3, wherein said bonding layer (4) has a thickness in the range 10 to 150 nm.

5. Brazing sheet product according to claim 1, wherein said layer (3) comprising nickel has a thickness of not more than 2.0 µm.

6. Brazing sheet product according to claim 1, wherein said aluminium clad layer (2) contains by weight Mg in an amount in the range of 0.5 to 5.0%.

7. Brazing sheet product according to claim 1, wherein said aluminium clad layer (2) contains by weight Zn in an amount in the range of 0.5 to 3.0%.

8. Brazing sheet product according to claim 1, wherein said aluminium clad layer (2) contains by weight Bi in an amount in the range of 0.01 to 0.5%.

9. Brazing sheet product according to claim 1, wherein said core sheet (1) is coupled to said aluminium clad layer (2) via an intermediate layer (5).

10. Brazing sheet product according to claim 1, wherein said core sheet (1) is an aluminium alloy comprising magnesium in an amount in the range of up to 8.0%.

11. An assembly of components joined by brazing, at least one said components being a brazing sheet product according to claim 1.

12. A method of manufacturing an assembly of brazed components, comprising the sequential process steps of:
  (a) forming said components of which at least one is made from brazing sheet product according to claim 1;
  (b) assembling the components into an assembly;
  (c) brazing the assembly under a vacuum or in an inert atmosphere in the absence of a brazing-flux at elevated temperature for a period long enough for melting and spreading of the clad layer; and
  (d) cooling the brazed assembly.

13. A method of use of an aluminium clad alloy in a brazing sheet comprising:
  forming components of which at least one is made from brazing sheet product according to claim 1 into an assembly; and
  brazing the assembly.

14. A method of use of an aluminium clad alloy comprising
  forming an assembly from components of which at least one is made from brazing sheet product according to claim 1; and
  brazing the assembly in an inert atmosphere in the absence of a brazing-flux material.

15. The method of use according to claim 14, wherein the aluminium clad alloy comprises, in weight %,
  Si 2 to 18
  Bi 0.01 to 1.0
  elements other than aluminium, Si and Bi, each up to 0.05%, total up to 0.20%
  balance aluminium.

16. The method of use according to claim 14, wherein the aluminium clad alloy comprises, in weight %,
  Si 2 to 18
  Mg 0.5 to 8.0
  Bi 0.01 to 1.0
  elements other than aluminium, Si, Mg, and Bi each up to 0.05%, total up to 0.20%
  balance aluminium.

17. The method of use according to claim 14, wherein the aluminium clad alloy comprises, in weight %,
  Si 2 to 18,
  Zn up to 5.0,
  Bi 0.01 to 1.0,
  elements other than aluminium, Si, Zn, and Bi each up to 0.05%, total up to 0.20%
  balance aluminium.

18. The method of use according to claim 14, wherein the aluminium clad alloy comprises, in weight %,
  Si 7 to 18
  Bi 0.01 to 0.5
  elements other than aluminium, Si and Bi each up to 0.05%, total up to 0.20%
  balance aluminium.

19. The method of use according the claim 14, wherein the aluminium clad alloy comprises, in weight %,
  Si 7 to 18
  Mg 0.5 to 2.5
  Bi 0.01 to 0.5
  elements other than aluminium, Si, Mg, and Bi each up to 0.05%, total up to 0.20%
  balance aluminium.

20. The method of use according the claim 14, wherein the aluminium clad alloy comprises, in weight %,
  Si 7 to 18
  Zn 0.5 to 3.0
  Bi 0.01 to 0.5
  elements other than aluminium, Si, Zn, and Bi each up to 0.05%, total up to 0.20%
  balance aluminium.

21. Brazing sheet product according to claim 1, wherein said aluminium clad layer (2) contains by weight Mg in an amount in the range of 0.2 to 2.0%.

22. Brazing sheet product according to claim 1, wherein the total of Bi, Pb, Li and Sb contained by said aluminium clad layer (2) is by weight an amount in the range of ≦1.0%.

23. Brazing sheet product according to claim 1, wherein said bonding layer (4) has a thickness of not more than 0.3 µm.

24. Brazing sheet product according to claim 1, wherein said layer (3) comprising nickel has a thickness of not more than 1.0 µm.

25. Brazing sheet product according to claim 1, wherein the aluminium clad layer (2) alloy consists of, in weight percent:
  Si 2 to 18

Mg up to 8.0
Zn up to 5.0
Cu up to 5.0
Mn up to 0.30
In up to 0.30
Fe up to 0.80
Sr up to 0.20
at least one element selected from the group consisting of:
  Bi 0.01 to 1.0
  Pb 0.01 to 1.0
  Li 0.01 to 1.0
  Sb 0.01 to 1.0
impurities each up to 0.05, total impurities up to 0.20, balance aluminium.

26. Brazing sheet product according to claim 25, wherein said aluminium clad layer (2) contains by weight Mg in an amount in the range of 0.2 to 2.0%.

* * * * *